(12) United States Patent
Min et al.

(10) Patent No.: US 10,220,939 B2
(45) Date of Patent: Mar. 5, 2019

(54) ACTIVE AIRFLOW SYSTEM AND METHOD OF REDUCING DRAG FOR AIRCRAFT

(71) Applicant: Sikorsky Aircraft Corporation, Stratford, CT (US)

(72) Inventors: ByungYoung Min, Glastonbury, CT (US); Barbara Brenda Botros, Vernon, CT (US); Razvan Virgil Florea, Manchester, CT (US); Patrick Bowles, Glastonbury, CT (US); Claude G. Matalanis, Longmeadow, MA (US); Brian E. Wake, South Glastonbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 215 days.

(21) Appl. No.: 15/262,671

(22) Filed: Sep. 12, 2016

(65) Prior Publication Data

US 2017/0225772 A1    Aug. 10, 2017

Related U.S. Application Data

(60) Provisional application No. 62/269,347, filed on Dec. 18, 2015.

(51) Int. Cl.
*B64C 21/04* (2006.01)
*B64C 7/00* (2006.01)
*B64C 27/10* (2006.01)

(52) U.S. Cl.
CPC ............. *B64C 21/04* (2013.01); *B64C 7/00* (2013.01); *B64C 27/10* (2013.01)

(58) Field of Classification Search
CPC ......... B64C 21/02; B64C 21/04; B64C 27/04; B64C 27/06; B64C 27/10; B64C 7/00
See application file for complete search history.

(56) References Cited

U.S. PATENT DOCUMENTS 3,005,496 A    10/1961   Nichols
3,101,920 A     8/1963   Fradenburgh
(Continued)

FOREIGN PATENT DOCUMENTS

| DE | 1114394 B | 9/1961 |
|----|-----------|--------|
| ES | 1137506 U | 3/2015 |
| JP | H439198 A | 2/1992 |

OTHER PUBLICATIONS

Extended European Search Report dated May 9, 2017 in related EP Patent Application No. 16194132, 9 pages.

*Primary Examiner* — Timothy D Collins
*Assistant Examiner* — Tye William Abell
(74) *Attorney, Agent, or Firm* — Cantor Colburn LLP

(57) ABSTRACT

A rotary wing aircraft includes a fuselage having a plurality of surfaces. At least one engine is mounted in the fuselage. A rotor assembly includes a rotor shaft a plurality of rotor blades operatively connected to the rotor shaft. The rotor assembly includes a plurality of surface portions. An active air discharge opening extends through one of the plurality of surfaces of the fuselage and one of the plurality of surface portions of the rotor assembly, and an active air generation system is mounted in the fuselage. The active air generation system is configured and disposed to generate and direct a flow of air through the active air discharge opening to disrupt an airstream flowing over the one of the plurality of surfaces of the fuselage and the one of the plurality of surface portions of the rotor assembly.

7 Claims, 3 Drawing Sheets

(56) References Cited

U.S. PATENT DOCUMENTS

| | | | |
|---|---|---|---|
| 3,130,942 A * | 4/1964 | Fradenburg | B64C 7/00 244/17.11 |
| 3,578,264 A | 5/1971 | Kuethe | |
| 4,212,588 A | 7/1980 | Fradenburgh | |
| 4,216,924 A | 8/1980 | Fradenburgh | |
| 4,598,887 A * | 7/1986 | Jordan | B64C 27/12 244/12.1 |
| 5,727,381 A | 3/1998 | Rogers | |
| 6,105,904 A | 8/2000 | Lisy et al. | |
| 6,837,465 B2 | 1/2005 | Lisy et al. | |
| 7,229,251 B2 | 6/2007 | Bertolotti et al. | |
| 7,413,408 B1 | 8/2008 | Tafoya | |
| 7,530,787 B2 | 5/2009 | Bertolotti et al. | |
| 8,985,503 B2 | 3/2015 | Desroche | |
| 9,764,824 B2 | 9/2017 | Song | |
| 9,868,516 B2 | 1/2018 | Rosenberger et al. | |
| 9,932,481 B2 | 4/2018 | Song | |
| 2004/0129838 A1 | 7/2004 | Lisy et al. | |
| 2006/0134379 A1 | 6/2006 | Pulkka | |
| 2006/0269411 A1 * | 11/2006 | Bertolotti | B64C 1/00 416/134 A |
| 2007/0018056 A1 | 1/2007 | Narramore | |
| 2009/0121075 A1 * | 5/2009 | Marze | B64C 11/001 244/17.19 |
| 2009/0304511 A1 * | 12/2009 | Brannon, III | B64C 7/00 416/179 |
| 2011/0036954 A1 | 2/2011 | Piasecki | |
| 2012/0018004 A1 * | 1/2012 | Ullman | B64C 7/00 137/14 |
| 2013/0001362 A1 | 1/2013 | Kreuzer et al. | |
| 2013/0214087 A1 * | 8/2013 | Corrigan | B64C 27/10 244/17.13 |
| 2013/0284294 A1 * | 10/2013 | Golling | F15C 1/12 137/833 |
| 2013/0291981 A1 * | 11/2013 | Lengers | B64C 21/04 137/825 |
| 2014/0255184 A1 | 9/2014 | Sutton | |
| 2014/0317900 A1 | 10/2014 | Desroche | |
| 2015/0147177 A1 * | 5/2015 | Alfano | B64C 7/00 416/134 A |
| 2016/0090171 A1 * | 3/2016 | Moret | B64C 7/00 416/244 R |
| 2016/0121997 A1 * | 5/2016 | Alfano | B64C 27/02 244/17.13 |
| 2016/0137296 A1 * | 5/2016 | Alfano | B64C 27/001 416/223 R |
| 2016/0137297 A1 * | 5/2016 | Alfano | B64C 27/001 416/245 R |
| 2016/0312035 A1 | 10/2016 | Song | |
| 2017/0001722 A1 | 1/2017 | Carpenter et al. | |
| 2017/0081021 A1 | 3/2017 | Song | |
| 2017/0088258 A1 * | 3/2017 | Alfano | B64C 27/32 |
| 2017/0174326 A1 | 6/2017 | Bowles et al. | |
| 2017/0225771 A1 | 8/2017 | Bowles et al. | |

* cited by examiner

ACTIVE AIRFLOW SYSTEM AND METHOD OF REDUCING DRAG FOR AIRCRAFT

CROSS-REFERENCE TO RELATED APPLICATIONS

The present application claims priority to U.S. Provisional Application No. 62/269,347 filed on Dec. 18, 2015, the contents of which are incorporated by reference herein in their entirety.

STATEMENT OF FEDERAL SUPPORT

This invention was made with Government support under Contract Number: W911W6-13-P-0010 awarded by the United States Army. The Government has certain rights in the invention.

BACKGROUND

Exemplary embodiments pertain to the art of aircraft and, more particularly, to an active airflow system and method of reducing drag for a rotary wing aircraft.

Conventional rotary-wing aircraft have a forward airspeed that is limited by a number of factors. Among these factors is the existence of drag when traveling at high speeds. Various surfaces on the rotary wing aircraft, both stationary and rotating, create drag during flight. Drag has a direct effect on aircraft power requirements, range, and efficiency. Accordingly, it is desirable to increase an overall airlift-to-equivalent-drag ratio (L/DE) to enhance an operational envelope of the rotary wing aircraft.

BRIEF DESCRIPTION

Disclosed is a rotary wing aircraft including a fuselage having a plurality of surfaces. At least one engine is mounted in the fuselage. A rotor assembly includes a rotor shaft. A plurality of rotor blades is operatively connected to the rotor shaft. The rotor assembly includes a plurality of surface portions. An active air discharge opening extends through one of the plurality of surfaces of the fuselage and one of the plurality of the surface portions of the rotor assembly, and an active air generation system mounted in one of the fuselage and the rotor assembly. The active air generation system is configured and disposed to generate and direct a flow of air through the active air discharge opening to disrupt an airstream flowing over the one of the plurality of surfaces of the fuselage and the one of the plurality of surface portions of the rotor assembly.

In addition to one or more of the features described above or below, or as an alternative, further embodiments could include wherein the rotor assembly includes a shaft fairing surrounding, at least in part, the rotor shaft, the active air discharge opening being formed in the shaft fairing.

In addition to one or more of the features described above or below, or as an alternative, further embodiments could include wherein the shaft fairing includes a leading edge surface portion, a trailing edge surface portion and first and second opposing side surface portions extending therebetween, the active air discharge opening being formed in at least one of the first and second opposing side surface portions.

In addition to one or more of the features described above or below, or as an alternative, further embodiments could include wherein the active air discharge opening includes a plurality of segmented slots fluidically connected to the active air generation system.

In addition to one or more of the features described above or below, or as an alternative, further embodiments could include wherein the rotor assembly includes a rotor hub operatively connected to the plurality of rotor blades, the active air discharge opening being formed in the rotor hub.

In addition to one or more of the features described above or below, or as an alternative, further embodiments could include wherein the active air discharge opening includes a plurality of segmented slots fluidically connected to the active air generation system.

In addition to one or more of the features described above or below, or as an alternative, further embodiments could include another plurality of rotor blades arranged outwardly of the plurality of rotor blades, wherein the rotor hub defines an upper hub member arranged outwardly of the plurality of rotor blades and inwardly of the another plurality of rotor blades.

In addition to one or more of the features described above or below, or as an alternative, further embodiments could include wherein the upper hub member includes an upper surface portion and an aft surface portion, the active air discharge opening comprising a plurality of openings formed on the upper surface portion.

In addition to one or more of the features described above or below, or as an alternative, further embodiments could include wherein the upper hub member includes an upper surface portion and an aft surface portion, the active air discharge opening comprising a plurality of openings formed on the aft surface portion.

Also disclosed is a method of reducing drag in a rotary wing aircraft including actively generating an airflow in the rotary wing aircraft, guiding the airflow through air ducts, and discharging the airflow through one or more active air discharge openings formed in one of a fuselage and a rotor assembly of the rotary wing aircraft, the airflow interrupting a boundary layer airflow over the one of the fuselage and the rotor assembly to reduce drag.

In addition to one or more of the features described above or below, or as an alternative, further embodiments could include wherein discharging the airflow includes passing the airflow through at least one active air discharge opening formed in a lateral side surface portion of a shaft fairing.

In addition to one or more of the features described above or below, or as an alternative, further embodiments could include wherein passing the airflow through the at least one active air discharge opening includes passing the airflow through a plurality of segmented slots formed in the lateral side surface portion of the shaft fairing.

In addition to one or more of the features described above or below, or as an alternative, further embodiments could include wherein discharging the airflow includes passing the airflow through at least one active air discharge opening formed in a rotor hub of the rotary wing aircraft.

In addition to one or more of the features described above or below, or as an alternative, further embodiments could include wherein passing the airflow through at least one active air discharge opening formed in the rotor hub includes discharging the airflow through a plurality of active air discharge openings formed in an upper surface portion of the rotor hub.

In addition to one or more of the features described above or below, or as an alternative, further embodiments could include wherein passing the airflow through at least one active air discharge opening formed in the rotor hub includes discharging the airflow through a plurality of active air discharge openings formed in an aft surface portion of the rotor hub.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
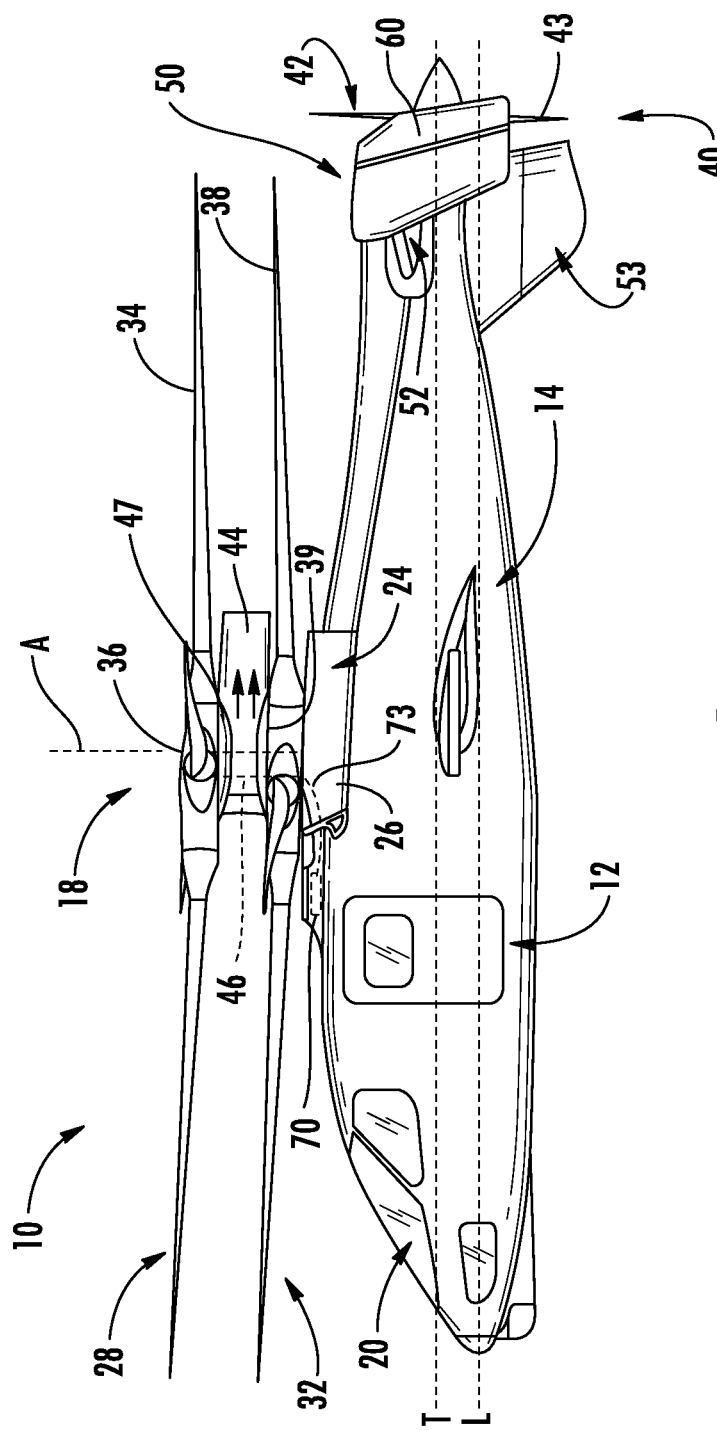
FIG. 1 depicts a rotary wing aircraft including an active air generation system, in accordance with an exemplary embodiment.
Figure 2:
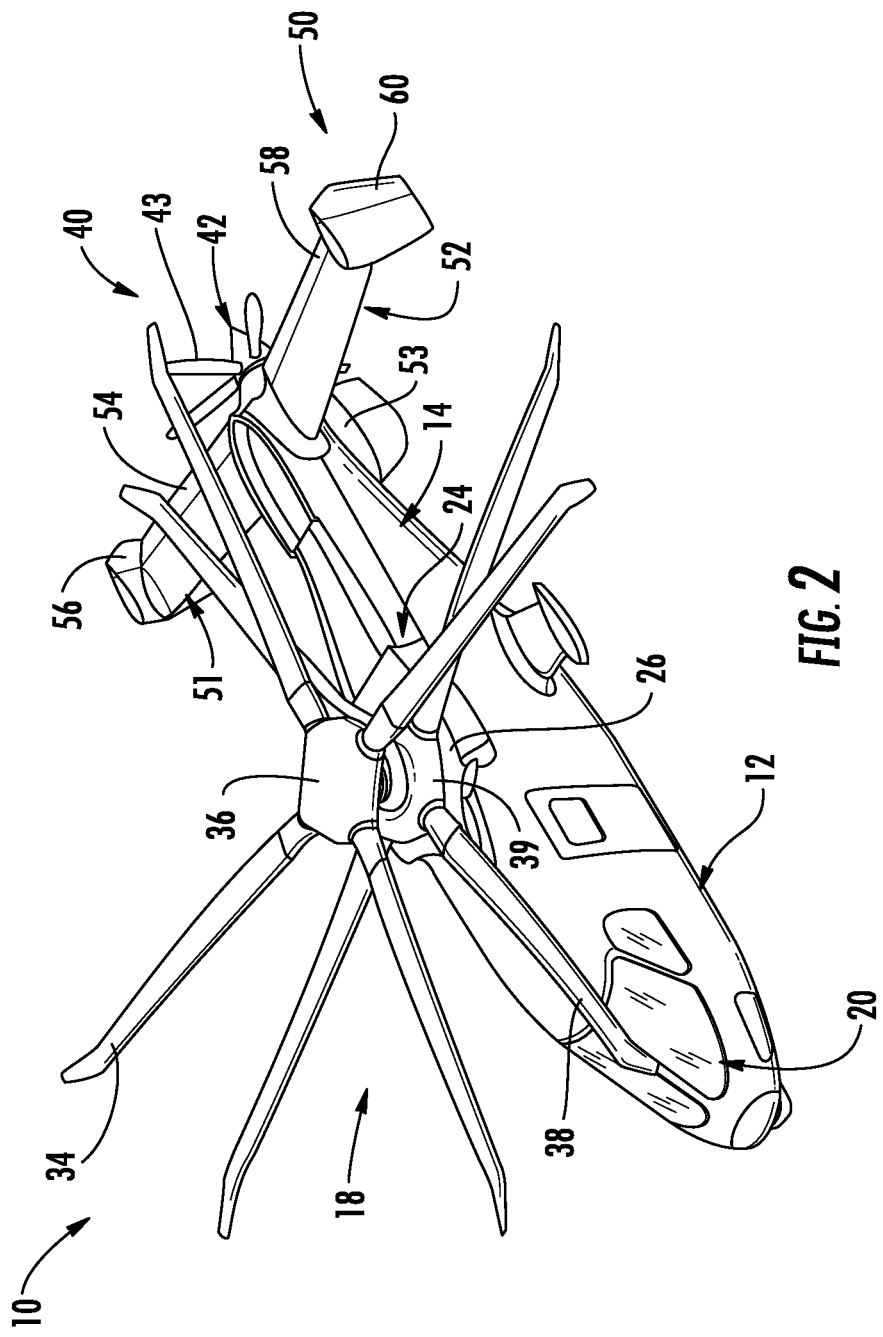
FIG. 2 is a perspective view of a rotary wing aircraft of FIG. 1, in accordance with an exemplary embodiment.

FIGS. 1 and 2 depict an exemplary embodiment of a rotary wing, vertical takeoff and landing (VTOL) aircraft 10. Aircraft 10 includes an airframe or fuselage 12 having a plurality of surfaces (not separately labeled) with an extending tail 14. A coaxial main rotor assembly 18 is located at the fuselage 12 and rotates about a main rotor axis, A. In an exemplary embodiment, the fuselage 12 includes a cockpit 20 having two seats for flight crew (e.g., pilot and co-pilot) and six seats for passengers (not shown). Main rotor assembly 18 is driven by a power source, for example, one or more engines 24, via a gearbox 26. Main rotor assembly 18 includes an upper rotor assembly 28 that may be driven in a first direction (e.g., counter-clockwise) about the main rotor axis, A, and a lower rotor assembly 32 that may be driven in a second direction (e.g., clockwise) about the main rotor axis, A, opposite to the first direction (i.e., counter rotating rotors). Of course, it should be understood that upper and lower rotor assemblies 28 and 32 may be driven in the same direction.

In accordance with an exemplary embodiment, upper rotor assembly 28 includes a first plurality of rotor blades 34 supported by a first or upper rotor hub 36. Lower rotor assembly 32 includes a second plurality of rotor blades 38 supported by a second, or lower rotor hub 39. In some embodiments, aircraft 10 may include a translational thrust system 40 having a propeller 42 located at extending tail 14 to provide translational thrust (forward or rearward) for aircraft 10. Propeller 42 includes a plurality of blades 43.

Main rotor assembly 18 also includes a shaft fairing 44 generally located between and around the upper and lower rotor assemblies 28 and 32 such that lower rotor hub 39 may be at least partially contained therein. Shaft fairing 44 extends about a rotor shaft 46 operatively connecting upper rotor assembly 28 and engine(s) 24. Shaft fairing 44 extends between lower hub 39 and an upper hub member 47 arranged inwardly of upper rotor assembly 28 and operates to reduce drag which might otherwise exist at rotor shaft 46. First plurality of rotor blades 34 may be connected to upper rotor hub 36 in a hingeless manner, also referred to as a rigid rotor system. Similarly, second plurality of rotor blades 38 may be connected to lower rotor hub 39 in a hingeless manner. Although a particular aircraft configuration is illustrated in this non-limiting embodiment, other rotary wing aircraft will also benefit from embodiments of the invention. Although, the dual rotor system is depicted as coaxial, embodiments include dual rotor aircraft having non-coaxial rotors. Further, while a particular aircraft configuration is illustrated in this non-limiting embodiment, other rotary wing aircraft will also benefit from embodiments of the invention.

Propeller 42, or translational thrust system 40, is connected to, and driven by, the engine 24 via the gearbox 26. Translational thrust system 40 may be mounted to the rear of the fuselage 12 with a translational thrust axis, T, oriented substantially horizontal and parallel to the aircraft longitudinal axis, L, to provide thrust for high-speed flight. The term "parallel" should be understood to include a translational thrust axis that is coincident with the longitudinal axis. Translational thrust axis, T, corresponds to the axis of rotation of propeller 42. While shown in the context of a pusher-prop configuration, it is understood that the propeller 42 could also be a more conventional puller prop or could be variably facing so as to provide yaw control in addition to, or instead of, translational thrust. It should be further understood that any such system or other translational thrust systems may alternatively or additionally be utilized. Alternative translational thrust systems may include different propulsion forms, such as a jet engine.

In accordance with an aspect of an exemplary embodiment, propeller blades 43 of translational thrust system 40 may include a variable pitch. More specifically, the pitch of propeller blades 43 may be altered to change the direction of thrust (e.g., forward or rearward). In accordance with another aspect of an exemplary embodiment, extended tail 14 includes a tail section 50 including starboard and port horizontal stabilizers 51 and 52. Tail section 50 also includes a vertical stabilizer 53 that extends downward from extending tail 14. Starboard horizontal stabilizer 51 includes a starboard active elevator 54 and a starboard active rudder 56. Similarly, port horizontal stabilizer 52 includes a port active elevator 58 and a port active rudder 60. Elevators 54 and 58 and rudders 56 and 60 act as controllable surfaces, e.g., surfaces that alter a flight path/characteristics of aircraft 10.

In accordance with an exemplary embodiment, aircraft 10 includes an active air generation system 70 arranged within fuselage 12. Active air generation system 70 may take the form of a dedicated fan or blower or, may form part of engine(s) 24. In accordance with an aspect of an exemplary embodiment, active air generation system 70 creates an airflow that is directed through one or more ducts, indicated at 73, into rotor assembly 18. As will be detailed more fully below, the airflow may be directed along one or more surfaces of shaft fairing 44 and/or upper hub member 47 in order to create boundary layer air interferences that result in localized drag reductions. Of course, it should be understood that while shown in connection with shaft fairing 44 and upper hub member 47, the airflow may be discharged from other surfaces in order to create localized drag reductions on other portions of rotor assembly 18 and/or fuselage 12.

Figure 3:
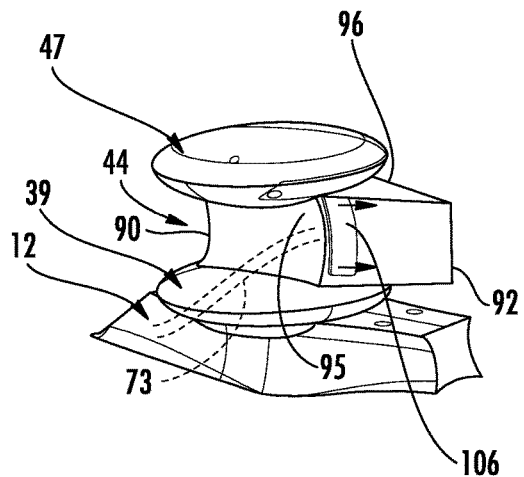
FIG. 3 depicts a shaft fairing of the rotary wing aircraft of FIG. 1 including an active air generation system, in accordance with an aspect of an exemplary embodiment.

In accordance with an aspect of an exemplary embodiment illustrated in FIG. 3, wherein rotor assembly 18 has been removed for sake of clarity and understanding, shaft fairing 44 includes a forward or leading edge surface portion 90, and an aft or trailing edge surface portion 92. A first lateral side surface portion 95 extends between leading edge surface portion 90 and trailing edge surface portion 92. Similarly, a second, opposing lateral side surface portion 96 extends between leading edge portion 90 and trailing edge portion 92.

In accordance with an exemplary embodiment, shaft fairing 44 includes an active air discharge opening 106 arranged on first lateral side surface portion 95. It should however be understood that an additional active air discharge opening (not shown) may be provided in second lateral side surface portion 96. Active air discharge opening 106 emits a flow of air produced by active air generation system 70. More specifically, active air generation system 70 produces a flow of air having a desired flow velocity. The flow of air passes through ducts 73 and out active air discharge opening 106 into surfaces of shaft fairing 44. The flow velocity and volume of air is designed to interrupt a boundary layer of air on surfaces of shaft fairing 44 generated by movement in and through an airstream. Interrupting the boundary layer of air on shaft fairing 44 leads to localized drag reductions which enhances an overall operational envelope of aircraft 10.

Figure 4:
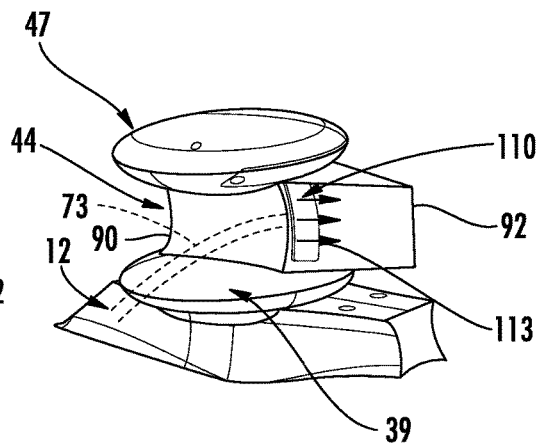
FIG. 4 a shaft fairing of the rotary wing aircraft of FIG. 1 including an active air generation system, in accordance with another aspect of an exemplary embodiment.

FIG. 4, wherein rotor assembly 18 has been removed for sake of clarity and understanding, and wherein like reference numbers represent corresponding parts in the respective views, depicts an active air discharge opening 110 having a plurality of segmented slots 113. Segmented slots 113 may be arranged to guide the air from active air generation system 70 onto particular portions of shaft fairing 44 in order to enhance drag reduction and further increase an overall operational envelope of aircraft 10. In a manner similar to that described above, segmented slots 113 emit a flow of air produced by active air generation system 70. More specifically, active air generation system 70 produces a flow of air having a desired flow velocity. The flow of air passes through duct(s) 73 and out plurality of segments slots 113 onto desired portions of shaft fairing 44. The flow velocity, volume and direction of the airflow is designed to interrupt a boundary layer of air on surfaces of shaft fairing 44 generated by movement in and through an airstream. Interrupting the boundary layer of air on shaft fairing 44 leads to localized drag reductions which enhances an overall operational envelope of aircraft 10.

Figure 5:
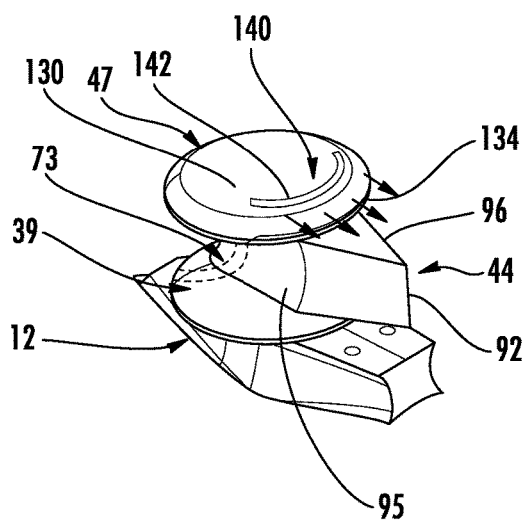
FIG. 5 depicts a rotor hub of the rotary wing aircraft of FIG. 1 including an active air generation system in accordance with yet another aspect of an exemplary embodiment.

FIG. 5, wherein rotor assembly 18 has been removed for sake of clarity and understanding, and wherein like reference numbers represent corresponding parts in the respective views, depicts upper hub member 47 having an upper surface portion 130 and an aft surface portion 134. In accordance with an aspect of an exemplary embodiment, upper hub member 47 includes a plurality of air discharge openings 140 shown in the form of slots 142 arranged on upper surface portion 130. With this arrangement, active air discharge openings 140 emit a flow of air produced by active air generation system 70. More specifically, active air generation system 70 produces a flow of air having a desired flow velocity. The flow of air passes through duct(s) 73 and out slots 142 onto surfaces of upper hub member 47. The flow velocity and volume of air is designed to interrupt a boundary layer of air on surfaces of upper hub member 47 generated by movement in and through an airstream. Interrupting the boundary layer of air on upper hub member 47 leads to localized drag reductions which enhances an overall operational envelope of aircraft 10.

Figure 6:
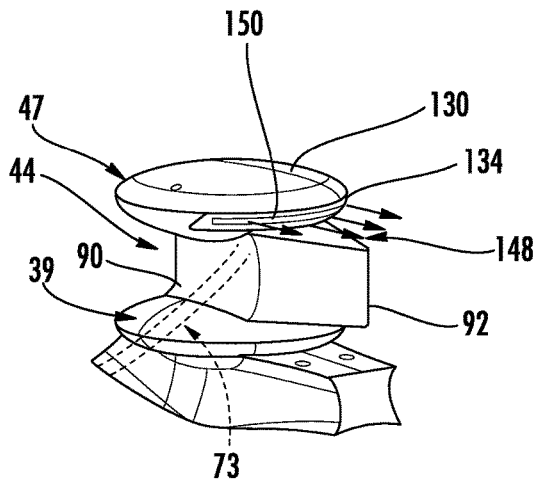
FIG. 6 depicts a rotor hub of the rotary wing aircraft of FIG. 1 including an active air generation system in accordance with still yet another aspect of an exemplary embodiment.

FIG. 6, wherein rotor assembly 18 has been removed for sake of clarity and understanding, and wherein like reference numbers represent corresponding parts in the respective views, depicts active air discharge openings 148, as a plurality of slots 150, formed on aft surface portion 134 of upper hub member 47. In a manner similar to that described above, slots 150 emit a flow of air produced by active air generation system 70. More specifically, active air generation system 70 produces a flow of air having a desired flow velocity. The flow of air passes through duct(s) 73 and out slots 150 into surfaces of upper hub member 47. The flow velocity and volume of air is designed to interrupt a boundary layer of air on surfaces of upper hub member 47 generated by movement in and through an airstream. Interrupting the boundary layer of air on upper hub member 47 leads to localized drag reductions which enhances an overall operational envelope of aircraft 10.

At this point it should be understood that exemplary embodiments describe an active air generation system that creates localized drag reductions on various surfaces of an aircraft. The active air generation system produces, in the aircraft, a flow of air that is passed through one or more active air discharge openings onto desired surfaces of the aircraft. The air interrupts, disrupts or otherwise changes a boundary layer of air on those surfaces to reduce drag and increase an increase an overall aircraft lift-to-equivalent-drag ratio (L/DE) to improve flight characteristics of the aircraft. It should also be understood that while described in terms of reducing draft on a shaft fairing and a hub, exemplary embodiments could be employed on other surfaces of the aircraft, including surfaces of the fuselage, rotor assembly, and extended tail. Further, it should be understood that the exemplary embodiments are not limited to deployment on rotary wing aircraft and could be utilized on other aircraft designs such as fixed wing aircraft, as well as manned and un-manned aircraft.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotary wing aircraft comprising:
    a fuselage including a plurality of surfaces;

at least one engine mounted in the fuselage;
a rotor assembly including a rotor shaft operatively connected to the at least one engine, a plurality of rotor blades operatively connected to the at least one rotor shaft, and a rotor hub having an upper surface operatively connected to the plurality of rotor blades, the rotor assembly including a plurality of surface portions;
a plurality of air discharge openings extending through the upper surface of the rotor hub;
and
an active air generation system mounted in one of the fuselage and the rotor assembly, the active air generation system being configured and disposed to generate and direct a flow of air out through the plurality of active air discharge openings to disrupt an airstream flowing over the one of the plurality of surfaces of the fuselage and the one of the plurality of surface portions of the rotor assembly.

2. The rotary wing aircraft according to claim 1, wherein the rotor assembly includes a rotor hub operatively connected to the plurality of rotor blades, the plurality of active air discharge openings being formed in the rotor hub.

3. The rotary wing aircraft according to claim 2, wherein the plurality of active air discharge openings includes a plurality of segmented slots fluidically connected to the active air generation system.

4. The rotary wing aircraft according to claim 2, further comprising: another plurality of rotor blades arranged outwardly of the plurality of rotor blades, wherein the hub defines an upper hub member arranged outwardly of the plurality of rotor blades and inwardly of the another plurality of rotor blades, wherein the plurality of active air discharge openings are formed on the upper hub member.

5. The rotary wing aircraft according to claim 2, wherein the hub includes an aft surface portion, the plurality of active air discharge openings being formed at the aft surface portion.

6. A method of reducing drag in a rotary wing aircraft comprising:
actively generating an airflow in the rotary wing aircraft;
guiding the airflow through air ducts; and
discharging the airflow through a plurality of air discharge openings formed in an upper surface of a rotor hub to interrupt a boundary layer airflow over the fuselage to reduce drag.

7. The method of claim 6, wherein passing the airflow includes discharging the airflow through the plurality of active air discharge openings formed at an aft surface portion of the rotor hub.

\* \* \* \* \*